of a United States Patent [19]

Perlman

[11] Patent Number: 4,920,269
[45] Date of Patent: Apr. 24, 1990

[54] LIQUID SCINTILLATION SOLUTION FOR MEASURING $^{222}$RN IN CHARCOAL

[75] Inventor: Daniel Perlman, Arlington, Mass.
[73] Assignee: Brandeis University, Waltham, Mass.
[21] Appl. No.: 268,172
[22] Filed: Nov. 7, 1988
[51] Int. Cl.$^5$ ............................................... G01T 1/20
[52] U.S. Cl. .................................. 250/364; 250/361 R
[58] Field of Search ............... 250/253, 255, 304, 328, 250/364

[56] References Cited

U.S. PATENT DOCUMENTS 4,812,648  3/1989  Perlman ............................. 250/255

OTHER PUBLICATIONS

A new Method for the Determination of Radon in Soil Air by the "Open Vial" and Integral Counting with a Liquid Scintillation Counter, Horjuchi and Murakami, Journal or Radio Analytical Chemistry, vol. 80 Nos. 1–2 (1983).
Desorbtion of Radon From Activated Carbon into a Liquid Scintillator, Prichard & Maliën, Analytical Chemistry, 1983 pp. 155–157.

Primary Examiner—Constantine Hannaher
Assistant Examiner—J. Eisenberg
Attorney, Agent, or Firm—Lorusso & Loud

[57] ABSTRACT

A solution which increases the efficiency of radon extraction from either dry or moist charcoal samples is disclosed. The addition of low molecular weight organic solvents such as methanol or ethanol to liquid scintillation counting solution increases radon extraction from 20–500% over known counting solutions. The increased efficiency appears to occur from increased penetration of the charcoal by the low molecular weight solvent which dissolves the radon gas and the subsequent diffusion of the low molecular weight solvent out of the charcoal and into the liquid scintillation counting solution.

11 Claims, No Drawings

LIQUID SCINTILLATION SOLUTION FOR MEASURING $^{222}$RN IN CHARCOAL

BACKGROUND OF THE INVENTION

This invention relates to radon extraction solvents. Typically, low molecular weight (LMW) organic solvents may be added to conventional liquid scintillation counting (LSC) solutions which have poor or suboptimal abilities to extract radon gas ($^{222}$Rn) from charcoal thereby producing LSC solutions which have optimal abilities to extract $^{222}$Rn from charcoal for measurement of the radiation from $^{222}$Rn and its radioactive daughter products. The invention also relates to the ability of these same solvents when added directly to charcoal to efficiently displace radon from the charcoal and into the gas and/or solvent phases which may be in close proximity to the charcoal. Many methods have been described for the measurement of $^{222}$Rn in air. Several methods rely upon the ability of activated charcoal to adsorb and retain $^{222}$Rn gas from the air. Subsequently, the radioactivity in the charcoal may be measured by direct gamma counting of the charcoal or alternatively by liberating the $^{222}$Rn gas from the charcoal within a closed system for radioactive measurement. With the latter method, for high measurement sensitivity and accuracy it is important that $^{222}$Rn liberation is efficient and reproducible. Only one previous study (Pritchard and Marien, Anal. Chem. 1983, 55, 155–157) has reported a method for liberation of $^{222}$Rn from charcoal into liquid scintillation solutions for radioactive counting. Using gamma counting of the original charcoal and of the separate solvent extract, the above study showed that after submerging granular charcoal in pure toluene for at least two hours and then removing the toluene, almost all of the radon could be accounted for in the toluene. However, quantitative solvent extraction or even high efficiency radioactive counting of radon was not demonstrated when charcoal remained mixed with the toluene (or any other solvents) or when the toluene contained dissolved fluors necessary for liquid scintillation counting. Pritchard and Marien reported that they obtained reproducible but not necessarily quantitative extraction of $^{222}$Rn comparing the (cpm) counts per minute data among multiple LSC vials having "2 g carbon residing on the bottom of the vial" containing a toluene liquid scintillation solution with unspecified fluors. It was separately demonstrated by Perlman that warming a charcoal sample which is either submerged or placed directly above an aromatic solvent based liquid scintillator (containing toluene or xylene for example), accelerates the displacement of $^{222}$Rn from the charcoal into the liquid scintillator.

The above prior art methods using toluene or other monocyclic aromatic solvents based liquid scintillators for extracting and counting radon in free granular charcoal suffer from one or more disadvantages including sub-optimal radon extraction efficiency in counting dry and especially moist (water-containing) charcoal samples, toxicity of the toluene solvent and vapor, and inconvenience and costs involved with incubation, or in the handling, loading, and disposal of the toxid liquid scintillator and the charcoal sample.

One object of the present invention is to provide a liquid scintillator which exhibits improved radon extraction efficiency in counting both dry and moist charcoal samples.

Another object of the invention is to provide a liquid scintillator which is non-toxic and is therefore safe and convenient to use, handle and to later recycle or discard.

A further object of this invention is to provide inexpensive solvents which are compatible with liquid scintillator solutions and which can be applied directly to charcoal to efficiently and rapidly displace the radon contained within the charcoal.

SUMMARY OF THE INVENTION

The invention involves the utilization of one or more radon extraction solvents, typically low molecular weight (LMW) solvents such as ethanol to release radon from charcoal. The previously unrecognized ability of certain solvents to perform this task permits formulation of new liquid scintillation (LS) solvent mixtures (commonly termed "cocktails") which show improved efficiency and speed of extraction of $^{222}$Rn from charcoal. Typically, the radon extraction solvents have molecular weights between 30 and 100 daltons. For example two of these, methanol and ethanol have molecular weights of 32 and 46 daltons respectively.

Conventional LS cocktails typically consist of an aromatic LS counting solvent (e.g., benzene, toluene, xylene, pseudocumene, didodecyl-benzene or other alkyl-benzenes, or multiaromatic-ringed solvents) and a dissolved fluor (e.g., PPO-POPOP). The fluor molecules emit light, i.e., fluoresce when excited through electron transfer in the aromatic solvent, initiated by an alpha or beta particle emitted during a radioactive decay event. The fluorescence events are typically detected in an LSC instrument by coincidence-coupled phototubes which electronically convert the scintillant light flashes into counts per minute. LS cocktails may also contain various detergents, solubilizers and emulsifiers which are carefully chosen to sustain optical clarity and miscibility when a variety of liquid samples are added to the cocktail. Pritchard and Marien (1983) discovered that radon could be extracted from charcoal by toluene and thereafter counted in a conventional toluene solvent-based LS cocktail. Incubation of radon-bearing activated charcoal in xylene or toluene-based cocktails results in extraction-equilibration and radon-daughter ingrowth within typically 6–12 hours depending upon the quantity and size of charcoal granules. This method gives reproducible counting results, but the efficiency of radon extraction is not optimized and the interference of moisture in the charcoal with efficient radon extraction is not recognized. It was believed that xylene and toluene which show high chemical partition coefficients for radon (~50-fold greater than water's partition of radon) would be among the best solvents for extracting radon from charcoal. Many variations on the Pritchard method have been developed (Perlman, 1986) including a rapid extraction procedure carried out by incubating the charcoal granules in a xylene-based LSC cocktail for 5 minutes at 80°–100° C. However, this solvent immersion-heat method and the method of heating charcoal positioned in the gas phase above the LSC cocktail do not substantially improve the final efficiency of radon extraction compared to that achieved more slowly at room temperature.

Recently diphenyl derivative solvent and long chain alkyl benzene solvent based LS cocktails have been tested for their abilities to extract radon. Unfortunately, some of these cocktails whose solvents are much less volatile and toxic than toluene or xylene, showed as little as 20% the radon extraction efficiencies shown by the prior art toluene and xylene-based cocktails. Experiments were performed to understand and solve the problem of poor radon extraction efficiency. It was found that although such low toxicity or essentially non-toxic high molecular weight aromatic solvents had high partition coefficients for radon, these larger aromatic molecules poorly infiltrated the small charcoal channels and spaces holding the radon atoms. It is now believed that high efficiency radon extraction from charcoal demands a solvent which can first penetrate into the very small adsorption channels within the charcoal, then dissolve the radon and finally diffuse out of the charcoal to liberate the radon. Empirically, it has been discovered that some LMW organic solvents are very efficient in performing this extraction even when diluted into diphenyl-derivative solvent-based and long chain alkyl benzene-based LSC cocktails which otherwise extract radon from charcoal very poorly. Several of these LMW organic solvents which are polar, are soluble or miscible in both water and in the LSC cocktail aromatic solvents. This solvent cross-solubility in water and LSC cocktail further enhances radon extraction from moisture containing charcoal. It has been empirically determined that a number of different radon extraction solvents can be usefully mixed with conventional LS cocktail counting solvents in volumetric proportions ranging from 2% extractiion solvent: 98% counting solvent to 90% extraction solvent: 10% counting solvent. A typical formulation for example employing ethanol extraction solvent utilized 20% absolute ethanol: 80% LS cocktail. The extraction solvents have been found to improve radon extraction between 10% and 500% depending upon the molecular weight of the aromatic solvent in the LSC cocktail and the moisture content of the charcoal. The presence of detergent, solubilizer, and emulsifier agents which are commonly included in LS cocktails used for counting aqueous samples does not interfere with the extraction of radon by the LMW organic solvents. Indeed, these said agents which increase the water-holding capacity of the LS cocktails may be helpful in the counting of radon-bearing charcoal samples in which significant moisture is present. Such moisture may be dissolved within the LS cocktail without decreasing the radioactive counting efficiency of radon.

DESCRIPTION OF PREFERRED EMBODIMENTS

The present invention employs LS cocktails containing one or more radon extraction solvents (typically organic solvents having molecular weights of less than 100 daltons) for extraction of radon from charcoal. With certain of these solvents such as ethanol, radon extraction efficiency is improved, cocktail toxicity is absent or minimal, and usage and disposal of the cocktail and charcoal is facilitated and simplified. In choosing a radon extraction solvent to be used in an LS cocktail of the present invention the solvent should do the following. (i) Infiltrate the charcoal either alone or in combination with the other ingredients in the LS cocktail to remove, transport or otherwise release the radon gas into the LS cocktail which surrounds, or is in close proximity to the charcoal. This movement of radon from inside to outside the charcoal is necessary so that subsequently produced alpha and beta radioactive decay particles which travel very short distances in liquids, will successfully interact with the solvent and fluor molecules in the LS cocktail and be made visible as light flashes outside the charcoal particles. (ii) The radon extraction solvent should substantially sustain overall radioactive counting efficiency of the original LS cocktail which lacked the LMW organic solvent. That is, certain solvents which cause excessive "quenching" ie. attenuation of fluorescence light output from the cocktail are unacceptable. (iii) The radon extraction solvent should preferably be non-toxic or be of low toxicity to facilitate use and disposal of the LS cocktail. Alternatively the extraction solvent if toxic should be readily detoxified or otherwise eliminated for disposal reasons. (iv) The extraction solvent should preferably be miscible in the remaining ingredients of the LS cocktail so that radon extracted from the charcoal is communicated directly to the vicinity of fluor molecules in the cocktail where fluorescence may occur. If the solvent is only partially soluble (or insoluble) in the remaining ingredients of the cocktail (or is introduced to the radon-bearing charcoal which is near but not submerged in the LS cocktail), then the solvent must be one favoring radon chemical partition into the fluor-containing cocktail phase. This chemical partition is necessary for the radon and subsequent decay particles to be counted following interaction with the fluor molecules in the cocktail. (v) The extraction solvent should preferably be miscible or partially soluble in water and thus polar, to improve extraction of radon from moist charcoal. In the course of exposing charcoal-type radon detectors to ambient radon-bearing air, charcoal can adsorb between zero and approximately 35% by weight water. The amount of water depends upon the relative humidity of the air, the duration of exposure, and a variety of other parameters including the presence or absence of desiccant in the vicinity of the charcoal. It has been found that LMW polar extraction solvents substantially improve the extraction of radon from moist charcoal. LMW polar organic extraction solvents such as ethanol, by being soluble in both water and higher molecular weight organic solvent-based LS cocktails, assist in dispersing the water in the cocktail. In this regard, the present invention, by providing solvents and LS cocktails for improved extraction of radon from charcoal, represents a substantial improvement over the prior art. The previous toluene and other aromatic solvent-based LS cocktails exhibited relatively poor efficiency of radon extraction from moist charcoal, had a relatively high vapor and solvent toxicity and created substantial inconvenience and expenses in attempting to dispose of the LS cocktail waste products. These problems have been solved by LS cocktails of the present invention. The present invention additionally provides LMW polar organic solvents which by themselves are generally effective in displacing radon from charcoal.

EXAMPLE 1

Low Molecular Weight Alcohols Extract $^{222}$Rn From Charcoal

A number of LMW alcohols were added to a variety of commercial aromatic LS cocktails (manufactured by the Beckman and Amersham Corporations containing for example xylene, pseudocumene, dodecyl benzene or diphenyl-based solvents such as phenyl xylyl ethane, isopropyl biphenyl and methyl diphenyl ethane) and the efficiencies of radon extraction from activated granular charcoal were subsequently monitored. Radon extraction and radon daughter ingrowth equilibrium prior to LS counting of 2 g radon-bearing charcoal in 10 ml LS cocktail, (incubated at 23° C.) was generally achieved in 6-8 hours. With proportions of alcohol to aromatic LS cocktail of between approximately 2%:98% and 90%:10% by volume, it was found that the LMW alcohols substantially enhanced the extraction of $^{222}Rn$ from charcoal. At alcohol proportions above about 90%, the LS cocktail fluor may become excessively diluted or the alcohol may quench fluorescence to reduce radioactive counting efficiency. Proportions of alcohol to aromatic solvent between 5%:95% and 50%:50% were found particularly useful. The lowest molecular weight alcohols, methanol (32 daltons) and ethanol (46 daltons), were found to be most effective in extracting radon from charcoal (extraction efficiencies in decreasing order: methanol>ethanol>>isopropanol) and were conveniently miscible in most of the commercial LS cocktails tested. Higher molecular weight alcohols such as propanol, butanol etc., showed progressively less ability to extract radon from charcoal. This observation suggests that one and two carbon alcohols are best capable of entering the smallest channels or pores in charcoal to displace $^{222}Rn$. Surprisingly the inorganic molecule water, which has even a lower molecular weight than methanol, was found to be poor solvent for quantitative displacement of $^{222}Rn$ from charcoal. It is likely that the properties of water including its relatively high solvent viscosity, high surface tension, and relative low partition coefficient for $^{222}Rn$ may be negative influencing factors in its radon extraction ability since an effective extraction solvent must be able to enter the finest pores in charcoal, solubilize the $^{222}Rn$ and then diffuse out of the charcoal, carrying the $^{222}Rn$.

Methanol and ethanol were found to be especially useful and effective for extracting $^{222}Rn$ from moist charcoal. The toxicity and higher volatility of methanol reduce its desirability relative to ethanol however. Methanol and ethanol added to toluene, xylene, and other benzene derivative-based LS cocktails increased the amount of radon extracted from dry charcoal approximately 10% to 25% (methanol being the more efficient) and from moist charcoal approximately 40% (data not shown). Methanol and ethanol added in comparable proportions to diphenyl derivative and long chain alkyl benzene-based LS cocktails increased extracted radon levels as much as 4-5 fold over the solvent alone (See Example 2 and Table 1 below).

EXAMPLE 2 Low Molecular Weight Alcohols Added to Conventional LS Cocktails Enhance the Extraction of $^{222}Rn$ From Charcoal Two gram samples of activated charcoal which contained radon were mixed with 15 ml of the prior art conventional toluene-based LS cocktail or with 15 ml of a diphenyl derivative solvent-based LS cocktail similar to that manufactured by Beckman Corp. and know as Ready Safe TM. Additional identical 2 g charcoal samples were added to 15 ml of the same LS solvents containing either methanol, ethanol or isopropanol in various percentages by volume. All samples were incubated at room temperature for 8 hours in 20 ml capacity LS vials prior to counting. Table 1 presents average counts per minute (cpm) values (each value based on duplicate samples differing in cpm by ±2%) as well as extraction and counting efficiency percentage values (efficiency) determined by prior art normalizing the cpm values to that value obtained with the conventional toluene-base LS cocktail described by Pritchard and Marien (1983). It can be seen that radon extraction efficiency can be substantially improved over that of the prior art (assigned value of 100% in Table1).

EXAMPLE 3

Solvents Can Be Directly Added to $^{222}Rn$ Bearing Charcoal to Displace the $^{222}Rn$ Solvents having low molecular weights between approximately 30 and 100 daltons (such as methanol, and ethanol), may be added directly to charcoal samples inside LS counting vials to displace the radon into the LS cocktail. For example 2 ml ethanol or methanol added to 2 g radon-bearing charcoal in a porous bag or a porous plastic canister suspended above 8 ml xylene-based LS cocktail (in a sealed LS counting vial) rapidly displaced the radon into the LS cocktail with high efficiency. The radon yield in the cocktail was 94% of that obtained by submerging untreated identical charcoal samples in the xylene-based LS cocktail which itself contained the same amount of alcohol. One advantage in suspending the charcoal above the LS cocktail rather than submerging it, is that any quenching of light output by charcoal dust in the LS cocktail can be essentially eliminated. Solvents which were relatively ineffective when mixed with LS cocktails in extracting radon from charcoal (eg. water and three carbon and higher alcohols), were also relatively ineffective in displacing radon when added directly to the charcoal.

EXAMPLE 4

Other Low Molecular Weight Organic Solvents Can Assist in $^{222}Rn$ Extraction From Charcoal Ketones and ethers such as acetone and ethyl ether were tested as radon extraction solvents. Twenty percent by volume of ether, acetone or ethyl ether was dissolved in a standard xylene-based LS cocktail and in Ready Safe TM diphenyl derivative LS cocktail as described in Example 2. Negligible fluoresence quenching and moderately good extraction of radon from charcoal were measured. Furthermore, the same solvents functioned to displace radon directly from charcoal placed in proximity to LS cocktails within LS counting vials as described in Example 3.

TABLE 1*

| LS Cocktail solvent | cpm | efficiency |
|---|---|---|
| Toluene solvent | 1196 | (100%) |
| +10% methanol | 1507 | 125% |
| +10% ethanol | 1423 | 119% |
| diphenyl derivative solvent+ | | |
| (solvent alone) | 359 | 30% |
| +3% methanol | 1224 | 102% |
| +10% methanol | 1525 | 128% |
| +20% methanol | 1536 | 128% |
| +3% ethanol | 767 | 64% |
| +10% ethanol | 1444 | 121% |
| +20% ethanol | 1450 | 121% |
| +7% isopropanol | 454 | 38% |
| +30% isopropanol | 608 | 51% |

*See Example 2 for explanation of this Table and definition of terms.
+This solvent is the same as that used in the "Ready Safe" LSC formulation of the Beckman Corp.

What is claimed:

1. A liquid scintillation counting solution for extracting and counting radon in charcoal comprising:
   a liquid scintillation counting solvent;

a light emitting fluor; and a radon extraction solvent wherein said radon extracting solvent increases the release of radon from charcoal, wherein said extracting solvent is one of an alcohol, ketone and ether having a molecular weight of less than 100 daltons.

2. The liquid scintillation counting solution according to claim 1 wherein the radon extraction solvent is methanol.

3. The liquid scintillation counting solution according to claim 1 wherein the radon extracting solvent is ethanol.

4. The liquid scintillation counting solution according to claim 1 wherein the volume ratio of the radon extraction solvent and the liquid scintillation solvent is between 5:95 and 50:50.

5. A method for extracting and counting radon comprising: mixing a solution of a liquid scintillation counting solvent, a light emitting fluor and a radon extracting solvent wherein said extracting solvent is one of an alcohol, ketone and ether, having a molecular weight of less than 100 daltons;

adding a sample of either dry or moist charcoal which contains radon to said solution, measuring the emitted light produced from the fluorescence of the light emitting fluor.

6. The method according to claim 5 wherein said radon extracting fluid is methanol.

7. The method according to claim 5 wherein said radon extracting solution is ethanol.

8. The method according to claim 5 wherein the volume ratio of the radon extraction solvent to the liquid scintillation solvent is between 5:95 and 50:50.

9. A method for extracting and counting radon in charcoal comprising:

adding a radon extracting solvent to charcoal which contains radon;

suspending the charcoal and radon extraction solvent, wherein said extraction solvent is one of an alcohol, ketone and ether, having a molecular weight less than 100 daltons, over a liquid scintillation solvent which contains a light emitting fluor;

measuring the emitted light produced from the light emitting fluor.

10. The method according to claim 9 wherein the radon extracting solvent is methanol.

11. The method according to claim 9 wherein the radon extraction solvent is ethanol.

* * * * *